US011090914B2

(12) United States Patent
Scurtescu et al.

(10) Patent No.: US 11,090,914 B2
(45) Date of Patent: Aug. 17, 2021

(54) SILICONE AND POLYMER SUBSTRATE COMPOSITE MATERIALS, METHODS, AND USES OF THE SAME

(71) Applicant: Smilesonica Inc., Edmonton (CA)

(72) Inventors: Cristian Scurtescu, Edmonton (CA); Pascal Bisson, Edmonton (CA)

(73) Assignee: SMILESONICA INC., Edmonton (CA)

( * ) Notice: Subject to any disclaimer, the term of this patent is extended or adjusted under 35 U.S.C. 154(b) by 308 days.

(21) Appl. No.: 15/511,167

(22) PCT Filed: Sep. 16, 2015

(86) PCT No.: PCT/CA2015/050901
§ 371 (c)(1),
(2) Date: Mar. 14, 2017

(87) PCT Pub. No.: WO2016/041077
PCT Pub. Date: Mar. 24, 2016

(65) Prior Publication Data
US 2017/0246847 A1    Aug. 31, 2017

Related U.S. Application Data

(60) Provisional application No. 62/050,868, filed on Sep. 16, 2014.

(51) Int. Cl.
*B32B 27/36* (2006.01)
*B32B 27/28* (2006.01)
(Continued)

(52) U.S. Cl.
CPC ............ *B32B 27/28* (2013.01); *B32B 25/08* (2013.01); *B32B 25/20* (2013.01); *B32B 37/14* (2013.01);
(Continued)

(58) Field of Classification Search
CPC ............ B32B 27/365; B32B 2250/24; B32B 2255/10; B32B 2255/205; B32B 2255/26;
(Continued)

(56) References Cited

U.S. PATENT DOCUMENTS 4,851,009 A * 7/1989 Pinchuk .................. A61L 27/34
623/66.1
4,872,932 A * 10/1989 Yoshikawa ............. B32B 15/06
156/151
(Continued)

FOREIGN PATENT DOCUMENTS

CA    2825043    11/2012
EP    2689929    1/2014
(Continued)

OTHER PUBLICATIONS

RF Sputtering of polymers NPL document, retrieved Jun. 19, 2019.*
Elastomeric Materials NPL document, retrieved Jun. 19, 2019.*
Machine translation of JP 2012-034159, retrieved Apr. 29, 2021.*

*Primary Examiner* — Michael B Nelson
(74) *Attorney, Agent, or Firm* — Russell Manning; FisherBroyles, LLP

(57) ABSTRACT

Composite materials and methods of producing the same are provided. In some embodiments, the composite materials can comprise a polymer substrate, an intermediary material, such as a metal or oxide, mechanically attached onto the polymer substrate, and an elastomer bonded to the polymer substrate on the side of the polymer substrate comprising the intermediary materials. The elastomer can be bonded to the polymer substrate irreversibly, where the elastomer and the polymer substrate cannot be separated at their interface without breaking either the elastomer or the polymer substrate. In some embodiments, a primer and/or an epoxy can also be used. Uses of material sputtering or sputtered materials are also provided to bond a parylene substrate and
(Continued)

silicone elastomer, or to enhance the relative strength of the bonding between the two. In addition, composite materials, and the use thereof, involving a parylene substrate, an elastomer receptacle, and liquid silicone are provided.

8 Claims, 7 Drawing Sheets

(51) Int. Cl.
  *C09J 5/02* (2006.01)
  *B32B 25/08* (2006.01)
  *B32B 25/20* (2006.01)
  *B32B 37/14* (2006.01)
(52) U.S. Cl.
  CPC .............. *C09J 5/02* (2013.01); *B32B 27/283* (2013.01); *B32B 2250/24* (2013.01); *B32B 2255/10* (2013.01); *B32B 2255/205* (2013.01); *B32B 2255/26* (2013.01); *B32B 2255/28* (2013.01); *B32B 2307/206* (2013.01); *B32B 2307/50* (2013.01); *B32B 2383/00* (2013.01); *B32B 2535/00* (2013.01); *C09J 2301/00* (2020.08); *C09J 2301/12* (2020.08); *C09J 2301/30* (2020.08); *C09J 2301/40* (2020.08); *C09J 2400/166* (2013.01); *C09J 2400/226* (2013.01); *C09J 2400/228* (2013.01); *C09J 2421/006* (2013.01); *C09J 2463/00* (2013.01); *C09J 2465/008* (2013.01); *C09J 2483/00* (2013.01); *C09J 2483/003* (2013.01); *Y10T 428/2843* (2015.01); *Y10T 428/31663* (2015.04)
(58) Field of Classification Search
  CPC .......... B32B 2255/28; B32B 2307/206; B32B 2307/50; B32B 2535/00; B32B 25/08; B32B 25/20; B32B 27/28; B32B 27/38; B32B 37/14; C09J 2400/166; C09J 2465/008; C09J 2483/003; C09J 5/02; C09J 2400/226; C09J 2400/228; C09J 2421/006; C09J 2463/00; C23C 14/205; C23C 14/34; C08J 5/12; B06B 1/0607; B06B 1/0622; B06B 1/067; B06B 2201/76; G10K 11/30; G10K 13/00; A61M 2005/14268; A61M 2205/0266; A61M 2205/3375; A61M 2205/8237; A61M 5/14244; A61M 5/14248; A61M 5/16809; A61M 5/16886; A61M 5/172; A61M 2205/3569; A61M 5/1413; A61M 2005/16863; A61M 2205/0294; A61M 2205/18; A61M 2205/3331; A61M 2205/3368; A61M 2205/3546; A61M 2205/3576; A61M 2205/50; A61M 2205/52; A61M 2206/22; A61M 2209/045; A61M 2230/201; A61M 5/142; A61M 5/14224; A61M 5/14586; A61M 5/1723; A61M 2005/1402; A61M 2005/14208; A61M 2005/14252; A61M 2005/14506; A61M 2005/1583; A61M 2005/1585; A61M 2005/1586; A61M 2205/04; A61M 2205/16; A61M 2205/3303; A61M 2205/3337; A61M 2205/3379; A61M 2205/3523; A61M 2205/3592; A61M 2205/502; A61M 2205/581; A61M 2205/582; A61M 2205/583; A61M 2205/8206; A61M 2207/00; A61M 5/14212; A61M 5/14216; A61M 5/1452; A61M 5/158; A61M 5/162; A61M 5/168; A61M 5/16804; A61M 5/16813; A61M 5/16831; A61M 5/365; A61M 5/5086; A61M 2205/6018; A61M 2209/086; A61M 2205/332; G05D 7/0647; G05D 7/0676; G08C 17/02; H04B 7/2609; Y10T 29/49236; Y10T 29/494; Y10T 29/49412; Y10T 29/49826; Y10T 29/49828; A61B 2560/0412; A61B 5/0024; A61B 5/1427; A61B 5/6833; A61B 2562/12; A61B 2562/16; A61B 5/0095; A61B 8/14; A61B 8/4444; A61B 8/4488; A61B 8/4494; A61B 8/546; A61J 1/20; F04B 43/02; F04B 43/09; F04B 43/1253; F04B 7/00; G01F 22/00; G01F 11/086; G05B 23/02; G01N 29/228; G01N 29/245; H01L 23/3675; H01L 23/3737; H01L 41/053; H01L 41/09; H01L 41/1876
  See application file for complete search history.

(56) References Cited

U.S. PATENT DOCUMENTS

| | | | | |
|---|---|---|---|---|
| 5,488,957 | A * | 2/1996 | Frey | C09J 5/00 600/472 |
| 5,837,313 | A * | 11/1998 | Ding | A61F 2/82 427/2.21 |
| 2002/0187260 | A1* | 12/2002 | Sheppard, Jr. | A61K 9/0009 427/248.1 |
| 2003/0069560 | A1* | 4/2003 | Adamis | A61K 9/0051 604/521 |
| 2005/0008763 | A1* | 1/2005 | Schachter | A61L 29/085 427/2.24 |
| 2008/0119711 | A1* | 5/2008 | Nikumb | A61N 1/0531 600/378 |
| 2009/0299167 | A1* | 12/2009 | Seymour | A61B 5/04001 600/393 |
| 2011/0015686 | A1* | 1/2011 | Kara | A61N 1/375 607/2 |
| 2013/0118128 | A1 | 5/2013 | Leucke | |
| 2013/0345738 | A1* | 12/2013 | Eskridge | A61B 17/12113 606/198 |

FOREIGN PATENT DOCUMENTS

| | | | |
|---|---|---|---|
| JP | 2012-034159 | * | 12/2012 |
| WO | 20040091908 | | 10/2004 |

* cited by examiner

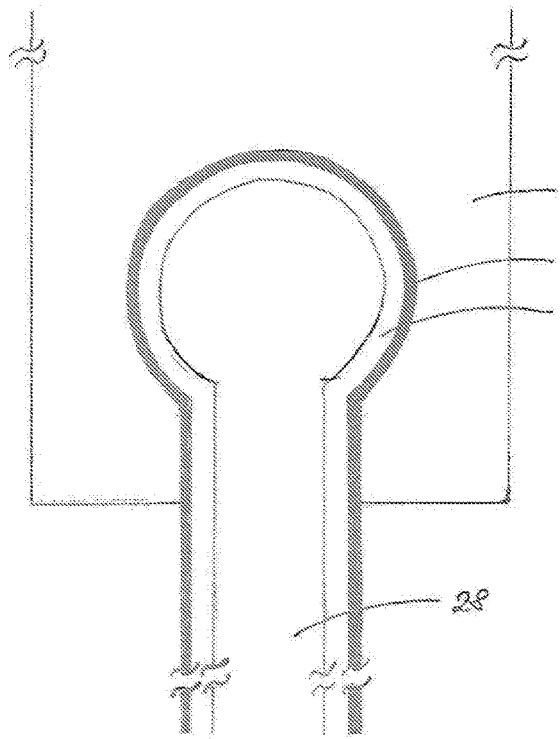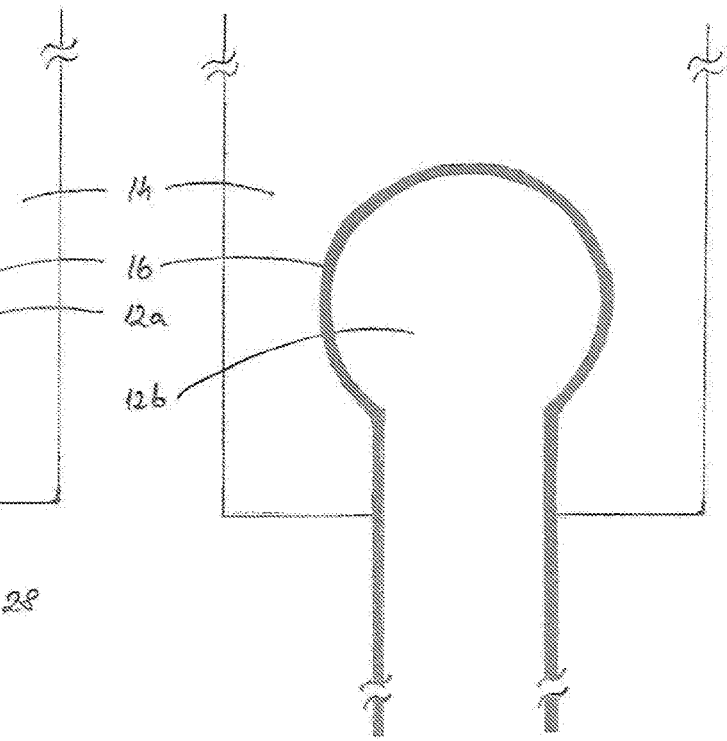
Figure 6A
Figure 6B
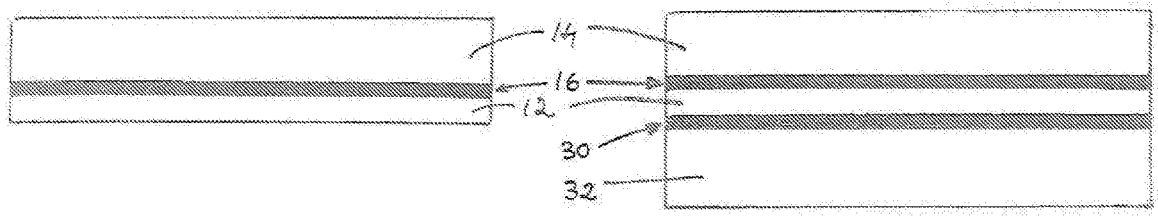
Figure 7A
Figure 7B

SILICONE AND POLYMER SUBSTRATE COMPOSITE MATERIALS, METHODS, AND USES OF THE SAME

CROSS REFERENCE TO RELATED APPLICATIONS

This application claims priority of U.S. Provisional Patent Application Ser. No. 62/050,868, entitled "Silicone and Polymer Substrate Composite Materials, Methods, and Uses of the Same", filed Sep. 16, 2014, and hereby incorporated by reference herein in its entirety.

TECHNICAL FIELD

The present application relates to bonding silicone elastomers to polymer substrates, and more particularly, bonding silicone elastomers to polymer substrates to increase the relative strength of the bond.

The present application also relates to silicone elastomers, liquid silicones, and polymer substrates, and more particularly, the use of liquid silicone to ameliorate delamination issues between silicone elastomers and polymer substrates.

BACKGROUND

By way of background, it is known that bonding silicone elastomers to polymer substrates is difficult to do with any efficiency in achieving a strong (irreversible) bond between the two materials. Several attempts have been performed, however only less desirable, reversible bonding can be achieved.

Parylene, as an example of a polymer, can be used in coatings such as a conformal coating which can be biocompatible and can also provide electrical insulation. When used on medical devices for a patient, a parylene coating can therefore prevent patient body fluids, such as blood or saliva, to enter in contact with the internal components of the device. When the internal device components include electronic components, the parylene coating can electrically insulate the internal parts from the patient.

Attempts to bond parylene coated parts with a silicone rubber/elastomer, (such as room temperature vulcanization (RTV) silicone, high temperature vulcanization (HTV) silicone, one component silicone, or liquid silicone rubber (LSR) silicone) using liquid injection molding, compression molding, transfer molding, injection molding, or extrusion processes, were not able to strongly bond the two materials even when using industry known approaches and solutions (available in literature and suggested by manufacturers) to enhance silicone bonding. These known approaches include the use of: a good cleaning of the parts before the silicone elastomer is applied, low temperature silicone curing, and coating the substrate (for example, parylene) with silicone primer before silicone molding or application.

Silicone elastomer is known to bond with other materials at a higher strength efficiently, but this is not seen when bonding with polymer substrates (for example, parylene).

In some cases, plasma treatment of parylene coated samples to enhance the parylene bondability can be used. It is known that plasma treatment such as Oxygen ($O_2$) plasma and Sulfur Hexafluoride ($SF_6$) plasma are used for enhancing bondability of polymers such as parylene. While these methods can increase the relative bonding between the materials, only a fair to good bonding of silicone to parylene substrate can be achieved. In addition, plasma treatment is time consuming, expensive, inconsistent, and only operable for a small area, or component, at a time.

Methods that result in strong bonding for depositing parylene coatings on a cured silicone elastomer substrate, rather than the other way around, are known in the art. For example, a parylene coating can be vapor deposited on a silicone elastomer substrate by placing the silicone substrate in a vacuum deposition chamber and drawing a vacuum in the chamber. The parylene monomer enters the deposition chamber at approximately room temperature and is adsorbed and polymerized onto the silicone substrate. The resultant coating is conformal, covering all exposed surfaces, and the bonding of the parylene to the silicone substrate is strong without the need of any substrate surface bondability enhancements (priming, plasma treatment, sputtering, etc), other than providing a clean substrate surface. The converse, however is not true, i.e. strong bonding is not achieved when depositing silicone elastomer coatings on a parylene substrate.

No bonding, weak, fair, or only good bonding of the materials can have many detrimental effects when a strong bonding is desired. For example, with less than strong bonding, delamination between silicone and parylene (or other polymer substrates) is an issue. In the cases of medical devices, this delamination can be unsafe and be cause for the replacement of the entire device. Immersing or cleaning an ultrasound transducer head (that has a silicone elastomer lens) with alcohols (such as IsoPropyl Alcohol (IPA)) is normally not recommended by manufacturers, as the alcohol can be absorbed in the elastomer and causes it to expand which can then create stress on the bonding line and result in total or partial delamination.

There remains a need to provide methods and materials for bonding silicone elastomers to polymer substrates to increase the relative strength of the bond, that can overcome the shortcomings of the prior art.

Silicone elastomer delamination from ultrasound transducers is also a significant industry problem that can affect the reliability and proper operation of ultrasound transducers heads. Potential negative effects on the quality of an ultrasound medical investigation (in the case of ultrasound imaging transducers) or therapy (in the case of therapeutic ultrasound transducers) can occur.

A prior study has looked at 676 ultrasound imaging transducers heads used in the market, and found that 26.5% of them had delamination defects. A similar study on 299 ultrasound imaging transducer heads found that 27.1% of the transducers had defects, most commonly caused by delamination or cable faults.

A third study looked at potential nosocomial infections from ultrasound transducer heads, and found that 27% of the transducer heads were contaminated with micro-organisms. After cleaning with 70% alcohol, 2.3% of transducer heads remained contaminated. Cleaning with alcohol is required to reduce the cross-infection potential between patients, however, the use of alcohols for cleaning transducer heads is not recommended by manufacturers as the alcohol can get absorbed into the silicone lens of the transducer, which can result in the silicone lens expanding and leading to delamination from the transducer.

There remains a need to provide methods and materials for preventing delamination that can overcome the shortcomings of the prior art.

SUMMARY

Composite materials and methods of producing the same are provided. In some embodiments, the composite materials can comprise a polymer substrate, an intermediary material, such as a metal or oxide, mechanically attached (for example, by sputtering or deposition) onto the polymer substrate, and an elastomer bonded to the polymer substrate on the side of the polymer substrate comprising the intermediary material. The elastomer can be bonded to the polymer substrate irreversibly, where the elastomer and the polymer substrate cannot be separated at their interface without breaking either the elastomer or the polymer substrate. In some embodiments, a primer and/or an epoxy can also be used. Uses of material sputtering or sputtered materials are also provided to bond a parylene substrate and silicone elastomer, or to enhance the relative strength of the bonding between the two. In addition, composite materials, and the use thereof, involving a parylene substrate, an elastomer receptacle, and liquid silicone are provided.

Broadly stated, in some embodiments, a composite material is provided comprising: a polymer substrate; an intermediary material mechanically attached through a deposition process onto at least one side of the polymer substrate; a primer disposed on the intermediary material; and an elastomer bonded to the polymer substrate on the at least one side of the polymer substrate comprising the intermediary material and primer, forming an intermediary material-and-primer interface between the polymer substrate and the elastomer; wherein the intermediary material and the primer enhance the relative strength of the bonding of the elastomer to the polymer substrate.

Broadly stated, in some embodiments, a composite material is provided comprising: a polymer substrate; an intermediary material sputtered onto at least one side of the polymer substrate; a primer disposed on the intermediary material; and an elastomer bonded to the polymer substrate on the at least one side of the polymer substrate comprising the intermediary material and primer, forming an intermediary material-and-primer interface between the polymer substrate and the elastomer; wherein the intermediary material and the primer enhance the relative strength of the bonding of the elastomer to the polymer substrate, where the elastomer is bonded to the polymer substrate irreversibly, and where the elastomer and the polymer substrate cannot be separated at the intermediary material-and-primer interface without breaking either the elastomer or the polymer substrate.

In some embodiments, the polymer substrate is selected from the group consisting of parylene and polycarbonate. In some embodiments, the parylene is selected from the group consisting of parylene-N, parylene-C, and parylene-D. In some embodiments, the elastomer is selected from the group consisting of liquid silicone rubber and room temperature vulcanization silicone. In some embodiments, the intermediary material is a metal or an oxide. In some embodiments, the metal is selected from the group consisting of Au, Ti, Al, W, and a combination thereof. In some embodiments, the oxide is selected from the group consisting of zinc oxide, tin oxide, and titanium dioxide. In some embodiments, the primer is a silicone primer. In some embodiments, the material further comprises a second layer of intermediary material sputtered onto a second side of the polymer substrate. In some embodiments, the material further comprises a second layer of elastomer bonded to the polymer substrate on the second side of the polymer substrate comprising the second layer of material, forming a second interface between the polymer substrate and the second layer of elastomer.

Broadly stated, in some embodiments, a method is provided for bonding a polymer substrate and an elastomer, the method comprising: providing the polymer substrate; sputtering a material onto at least one side of the polymer substrate; priming the least one side of the polymer substrate to enhance the relative strength of the bonding of the elastomer to the polymer substrate; and bonding the elastomer to the polymer substrate on the at least one side of the polymer substrate comprising the material, forming an interface between the elastomer and the polymer substrate; wherein the elastomer is bonded to the polymer substrate irreversibly, where the elastomer and the polymer substrate cannot be separated at their interface without breaking either the elastomer or the polymer substrate.

In some embodiments, the material is a metal or an oxide. In some embodiments, the method further comprises applying epoxy to the least one side of the polymer substrate to enhance the relative strength of the bonding of the elastomer to the polymer substrate.

Broadly stated, in some embodiments, a method is provided for bonding a polymer substrate and an elastomer, the method comprising: providing the polymer substrate; applying epoxy to at least one side of the polymer substrate to enhance the relative strength of the bonding of the elastomer to the polymer substrate; priming the least one side of the polymer substrate to enhance the relative strength of the bonding of the elastomer to the polymer substrate; and bonding the elastomer to the polymer substrate on the at least one side of the polymer substrate comprising the epoxy, forming an interface between the elastomer and the polymer substrate; wherein the relative strength of the elastomer bonding to the polymer substrate is enhanced.

Broadly stated, in some embodiments, a use of material sputtering to bond a parylene or polycarbonate substrate and an elastomer is provided. In some embodiments, the material is a metal or an oxide. In some embodiments, the elastomer is silicone.

Broadly stated, in some embodiments, a use of material sputtering to enhance bonding between a parylene or polycarbonate substrate and an elastomer is provided. In some embodiments, the material is a metal or an oxide. In some embodiments, the elastomer is silicone.

Broadly stated, in some embodiments, a use of sputtered material to bond a parylene or polycarbonate substrate and an elastomer is provided. In some embodiments, the material is a metal or an oxide. In some embodiments, the elastomer is silicone.

Broadly stated, in some embodiments, a use of sputtered material to enhance bonding between a parylene or polycarbonate substrate and an elastomer is provided. In some embodiments, the material is a metal or an oxide. In some embodiments, the elastomer is silicone.

Broadly stated, in some embodiments, a composite material is provided comprising: a parylene substrate; a silicone elastomer receptacle surrounding the substrate, the receptacle for receiving liquid silicone and positioning the liquid silicone proximate the substrate; and means, integral with the receptacle, for introducing the liquid silicone into the receptacle.

In some embodiments, the means comprises an injection valve for receiving external liquid silicone and a channel connecting the valve and the receptacle for introducing the liquid silicone into the receptacle. In some embodiments, the means comprises an liquid silicone capsule for producing liquid silicone and a pathway connecting the capsule and the receptacle for introducing the liquid silicone into the receptacle.

Broadly stated, in some embodiments, a method is provided for emitting ultrasound waves to a target area for treatment of imaging, the method comprising: providing an ultrasound emitting device comprising at least one ultrasound transducer and a composite material as described herein, wherein the composite material is for being positioned between the ultrasound transducer and the target area; introducing or releasing liquid silicone into the receptacle; emitting ultrasound waves from the ultrasound transducer; allowing the ultrasound waves to pass through the parylene substrate; allowing the ultrasound waves to pass through the liquid silicone; and allowing the ultrasound waves to pass through the silicone elastomer receptacle prior to reaching the target area.

Broadly stated, in some embodiments, a method is provided for emitting ultrasound waves to a target area for treatment of imaging, the method comprising: providing an ultrasound emitting device comprising at least one ultrasound transducer and a composite material as described herein, wherein the composite material is for being positioned between the ultrasound transducer and the target area; emitting ultrasound waves from the ultrasound transducer; allowing the ultrasound waves to pass through the polymer substrate; and allowing the ultrasound waves to pass through the elastomer prior to reaching the target area.

BRIEF DESCRIPTION OF THE DRAWINGS

FIGS. 6A and 6B are two dimensional cross-section depictions of embodiments of three dimensional (3D) supports to which an enhanced bonding structure can be utilized to bond silicone elastomer to a polymer coated support using a sputtered material, such as metal or oxide.

FIG. 7A depicts a cross-section view of an embodiment of a composite material similar in structure to that of FIG. 2, however the support has been removed from the substrate.

FIG. 7B depicts a cross-section view of an embodiment of a composite material such as that depicted in FIG. 7A, further comprising a second sputtered material layer on the opposite side of the substrate than the first sputtered material layer and a second layer of silicone elastomer applied on the second metal layer.

DETAILED DESCRIPTION OF EMBODIMENTS

Figure 1:
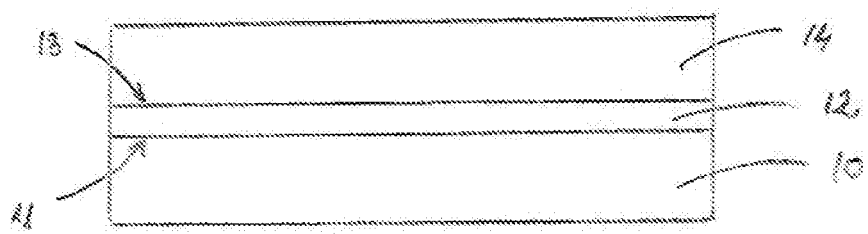
FIG. 1 depicts a cross-section view of an embodiment of a composite material of an initial structure that results in no bonding between a substrate, such as parylene or other polymers, and a silicone elastomer. In such an embodiment, if the substrate is a polycarbonate, the bonding of the elastomer can be reversible, but not strong (irreversible).

Composite materials and methods of producing the same are provided. In some embodiments, the composite materials can comprise a polymer substrate, an intermediary material, such as a metal or oxide, mechanically attached (for example, by sputtering or deposition) onto the polymer substrate, and an elastomer bonded to the polymer substrate on the side of the polymer substrate comprising the intermediary material. The elastomer can be bonded to the polymer substrate irreversibly, where the elastomer and the polymer substrate cannot be separated at their interface without breaking either the elastomer or the polymer substrate. In some embodiments, a primer and/or an epoxy can also be used. Uses of material sputtering or sputtered materials are also provided to bond a parylene substrate and silicone elastomer, or to enhance the relative strength of the bonding between the two. In addition, composite materials, and the use thereof, involving a parylene substrate, an elastomer receptacle, and liquid silicone are provided.

Certain polymers are known to have desirable properties to use in composite materials. For example the properties of parylene, such as Parylene-C, include that it can be a chemical vapor deposited polymer, can provide a good moisture and dielectric barrier (electrical insulator), and is biocompatible. Parylene is a trade name for a variety of chemical vapor deposited poly(p-xylylene) polymers. Among them, parylene-C is used as an example substrate in the present disclosure, however, other types of parylene (A, D, E, N, X, AM, HT, SF, AF-4, VT-4 (also called parylene F)) could also be used. Another material with similar functional properties (such as being a good electrical insulator and being biocompatible) is polycarbonate. Polycarbonate is a thermoplastic polymer. As such, it would be understood that the silicone elastomer bonding techniques provided herein can also be applied to other polymer substrates such as polycarbonates.

In some embodiments, if an increased relative strength of adhesion/bonding is desired between the silicone elastomer and the sputtered material coated parylene, a primer can be applied on the sputtered material. In some embodiments, the primer can be a silicone primer. In some embodiments, the sputtered material can be metal or oxide.

In some embodiments, if an increased relative strength of adhesion/bonding is desired between the elastomer and the coated parylene, an intermediary thin layer of biocompatible epoxy (for example 301-2FL™ from Epotek™) can be applied on top of a parylene coated support. The epoxy can then be cured, and then the silicone elastomer can be molded over the epoxy coated parylene. In some embodiments the application of epoxy can provide a non-uniform thickness, as such, contexts where a non-flat coating is required (for example the case of an ultrasound lens, optical lens, etc.) this property can be advantageous.

In some embodiments, if further enhancement of the bonding strength between the epoxy and the silicone elastomer is desired, a material can be sputtered on the epoxy followed by primer application on the material sputtered surface before the elastomer is molded over. In some embodiments, the sputtered material can be metal or oxide.

In some embodiments, more uniform methods of coating can be used, such as coatings using evaporation, sputtering, pulsed laser deposition, or other deposition methods and equipment. Certain supports and substrates can require upper temperature limits in order to avoid damage to the support and/or substrate. These deposition methods may involve the rotation of the part to be coated in order to provide a more uniform coating of the part.

Materials that can be deposited and used as coating of the polymer substrate in order to enhance to bondability between the polymer substrate and silicone elastomer can be: metals (aluminum, gold, tungsten, titanium), metal alloys (such as Titanium/Tungsten), metal oxides (such as zinc oxide, tin oxide, titanium dioxide), metal nitrides (titanium nitride, aluminum nitride, tantalum nitride) or insulators (such as silicon dioxide also known as silica).

Metals commonly available for sputtering are Gold (Au), Tungsten (W), Aluminum (Al), Titanium/Tungsten (Ti/W) alloy, and Titanium (Ti) films. In some embodiments, the sputtered metal layer/film can be deposited in a manner that it is continuous over the front surface and sides of the parts. In some embodiments, the film can be a thin film of about 200 nanometers.

The composite materials and methods provided herein can provide solutions to replace a non-existing/non-available chemical bonding between silicone elastomer and a polymer, such as parylene, by utilizing a sputtered material layer that can mechanically anchor/embed into the polymer substrate, and then this anchored sputtered material can provide strong chemical bondability to a silicone elastomer, therefore resulting in strong attachment of the elastomer to the polymer via the sputtered metal layer. In some embodiments, the sputtered material can be metal or oxide.

Sputtered metals (for instance Ti) on parylene coated surfaces can increase the bond strength between parylene and a silicone elastomer material. The silicone elastomer can be attached to parylene by molding, pouring, or casting following by curing process, or a combination of silicone adhesive and a pre-cured silicone layer. The use of sputtered Ti on parylene can result in a support (for example, an ultrasound transducer in silicone encapsulation) that is less prone to delamination due to mechanical, thermal, or chemical agents. For example, a representative embodiment of a completed structure can be immersed in 99% isopropyl alcohol (IPA) and the bond strength can remain strong with a weakening of the bond only observed after 12 hours of immersion and even then with only a slight reduction in the relative bond strength (for example, from a five to a four according to the five point scales described herein, for example in Tables 1 and 2).

Immersing or cleaning an ultrasound transducer head (that has a silicone lens) with alcohols (such as IPA) is normally not recommended by manufacturers, as the alcohol can be absorbed in the elastomer and causes it to expand which can then create stress on the bonding line and results in total or partial delamination. The composite materials and methods provided herein can reduce this vulnerability of transducer heads, which can lead to better and faster cleaning of transducer heads using alcohols.

In order to create some embodiments of the composite materials, a substrate (such as a polymer substrate) can be provided and all substrates can be cleaned prior to any substrate treatment. The cleaning process can include IPA sonication followed by rinsing with deionized (DI) water and then drying the parts prior to silicone elastomer coating or molding.

The use of a sputtered metal film (such as Ti) and silicone primer can result in an improvement of the bonding of the silicone elastomer to the substrate, such as a parylene substrate, from one (no bonding)(with or without silicone primer) or three (fair) (when $O_2$ plasma is used to activate the parylene substrate) or four (good) (when $SF_6$ plasma is used to activate the parylene substrate) to the maximum possible bonding strength of five (strong bonding) on the five point scale described herein (see Tables 1 and 2). In addition, the use of sputtered metal and a silicone primer to bond silicone elastomer to a parylene substrate can give consistent results with all the bonding areas displaying similar strong bonding.

Similarly, the use of a sputtered oxide film (such as $TiO_2$) and silicone primer can result in an improvement of the bonding of the silicone elastomer to the substrate, such as a parylene substrate, from one (no bonding) (with or without silicone primer) to the maximum possible bonding strength of five (strong bonding) on the five point scale described herein (see Tables 1 and 2).

Regarding using plasma ($O_2$ or $SF_6$) alone the resulting bonding strength is not always consistent, with some areas displaying weaker bonding than others. This may be explained by the fact that plasma treatment itself may not be uniform across the substrate, particularly for 3D substrates or large substrates (compared with the dimension of the plasma in the plasma chamber). Therefore the composite materials and methods herein can provide not just a stronger relative bond, but also a more consistent and repeatable bonding strength.

Other sputtered metals such as W or W/Ti alloys can show similar results as with Ti. However, Ti can be used when a biocompatible structure is desired, as Ti and its oxides are known to be biocompatible materials. A gold coating can provide a better bonding (weak bonding, two-scale) then just parylene, but not as strong as a Ti/W coating which can result in strong bonding (five-scale).

Other sputtered oxides such as $Al_2O_3$, $TaO_x$, or $CrO_x$ can show similar results as with $TiO_2$ or $SiO_2$. However, $TiO_2$ or $SiO_2$ can be used when a biocompatible structure is desired, as these oxides are known to be biocompatible materials.

The within information teaches the application of the silicone elastomer by molding, however, any appropriate type of attachment of the silicone elastomer to the polymer substrate is actually contemplated. For example a silicone elastomer could be pre-manufactured and cured, and applied on top of the parylene (parylene+Ti+silicone primer) substrate by using a silicone adhesive.

TABLE 1

Summary of bonding results

| Substrate | Structure | Substrate treatment | Bonding strength (substrate-silicone) |
|---|---|---|---|
| Parylene | Parylene + silicone | None | 1 no bonding |
| Parylene | Parylene + silicone | Silicone primer | 1 no bonding |
| Parylene | Parylene + silicone | $O_2$ plasma | 3 fair |
| Parylene | Parylene + epoxy + silicone | None | 3 fair |
| Parylene | Parylene + silicone | $SF_6$ plasma | 4 good |
| Parylene | Parylene + Ti + silicone | None | 3 fair |
| Parylene | Parylene + Ti + silicone | Silicone primer | 5 strong |
| Parylene | Parylene + $TiO_2$ + silicone | Silicone primer | 5 strong |
| Polycarbonate | Polycarbonate + silicone | None | 3 fair |
| Polycarbonate | Polycarbonate + silicone | Silicone primer | 4 good |
| Polycarbonate | Polycarbonate + Ti + silicone | None | 3 fair |
| Polycarbonate | Polycarbonate + Ti + silicone | Silicone primer | 5 strong |

Referring now to FIG. 1, an embodiment of an initial composite material structure that results in no bonding between substrate 12 and elastomer 14 is depicted. The substrate 12 can be a polymer coating/layer such as parylene 12a, polycarbonates 12b, or other polymers. In some embodiments, elastomer 14 can be any silicone elastomer (heat cured or room temperature cured) or silicone adhesive.

A support 10 can be provided. Support 10 can be a structure that can support substrate 12. In some cases, support 10 can be a bare ultrasound transducer or other material. In some embodiments support 10 can also be removable/detachable from the rest of the composite material structure and allow the remaining composite material structure to be further processed and/or function independently.

Interface 11 can be formed between substrate 12 and support 10. In some embodiments, the bond at this interface 11 can be assumed to be strong and achieved by means know in the art. For example if support 10 is the surface of an ultrasound transducer (the top metal electrode), substrate 12 can be a vapor deposited parylene. The bonding/adhesion between the parylene and transducer can be very strong as the parylene will anchor on all the surface micro-roughness points of the transducer. In other cases, if enhancing parylene adhesion to support 10 is desired (for example when bonding to glass), a silane primer (for example A174 or A171) can be used for an adhesion promoter of the parylene to support 10. On the other hand, if it is desired to separate support 10 from substrate 12, an adhesion inhibitor could be used such as mold release grease, soap, waxed surface, etc.

Interface 13 between substrate 12 and silicone elastomer 14 has weak or no relative bonding in the absence of any additional bonding assistance. This interface 13 is where the separation of materials and delamination can happen.

Figure 2:
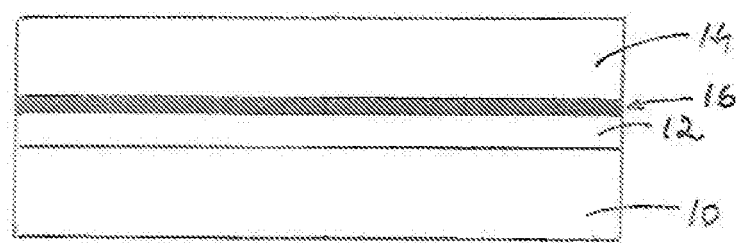
FIG. 2 depicts a cross-section view of an embodiment of a composite material of a structure that can result in enhanced bonding of a substrate to a silicone elastomer by adding a sputtered material (such as a metal or oxide) layer to the substrate.

Referring now to FIG. 2, an embodiment of an initial composite material structure that results in enhanced bonding by adding a deposited intermediary material (such as metal or oxide) layer/film 16 on the top of substrate 12, before silicone elastomer 14 is applied. Sputtered material layer/film 16 can be any metal such as Ti or W or other metal or metal alloys, or any oxide such as $TiO_2$ or $SiO_2$ or other oxides. The metal or oxide can be applied by means of sputtering for example, or any other method of application that allows the metal or oxide to mechanically embed/attach in substrate 12.

Figure 3:
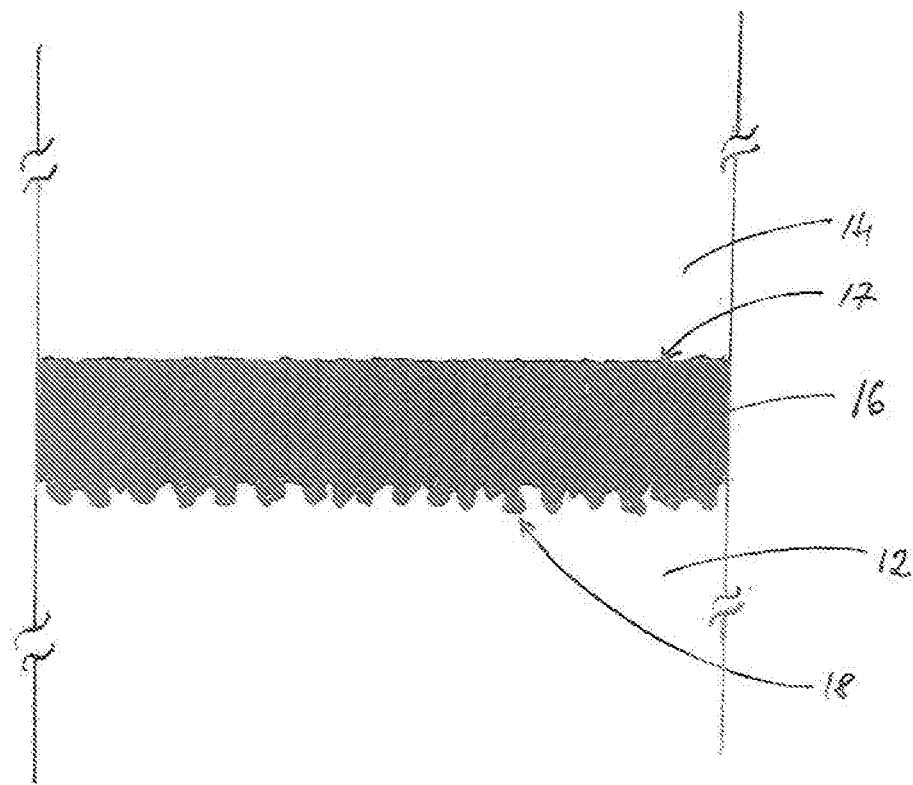
FIG. 3 is a magnified cross-section view depicting an embodiment of the interface of the composite material embodiment of FIG. 2.

Referring now to FIG. 3, a magnified cross-section view depicting the interface of the composite material embodiment of FIG. 2 is provided. The layers 12, 16 and 14 and interfaces 17 and 18 there between are shown. In this structure, a continuous layer of sputtered material 16 can provide for increased relative bonding between the layers. Interface 18 between substrate 12 and sputtered material 16 can comprise mechanical anchors of sputtered material embedded in substrate 12 during the sputtering process. This embedment can result in a strong mechanical bonding between layers 16 and 12. Interface 17 between material 16 and silicone elastomer 14 is the interface where a silicone primer can be applied prior to the silicone elastomer application. Interface 17 can provide for a strong bond, for example a chemical bond, of silicone elastomer 14 to material 16. The silicone primer can be applied with techniques as would be known in the art (for example, by manual Q-tip™/stick application, dunking, spraying etc. in concentrated form or diluted form).

The thickness of material layer 16 can be set in such a way to allow the continuity of the film on all surfaces of interest, including crevices, side walls etc. If a sputtering process is used, for example, substrate 12 could also be tilted or rotated during the sputtering process to allow further coverage of the sputtered metal on more shadowed areas of a complex three dimension substrate 12. Therefore the thickness of the metal layer can vary from area to area of a part, depending on the 3D structure of the part, however, the stronger relative bonding can be obtained on areas where the material film 16 is continuous. If the continuity of the film 16 cannot be fully achieved for some shadowed areas of the substrate, then partial material 16 coverage will also improve the bonding (compared with a composite structure in the absence of material film 16).

Figure 4:
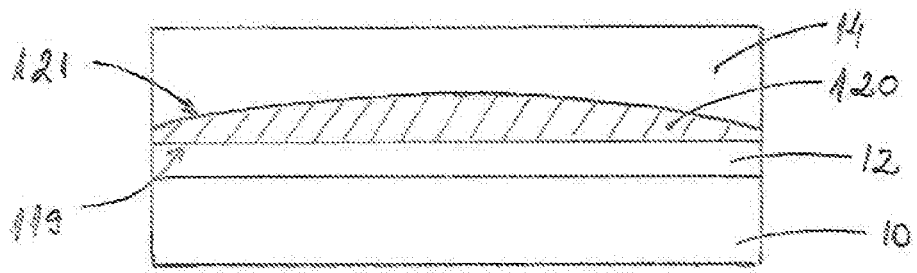
FIG. 4 depicts a cross-section view of an embodiment of a composite material of a structure that can result in enhanced bonding of a substrate to a silicone elastomer using a layer of epoxy.

Referring now to FIG. 4, an embodiment of a composite material structure that results in enhanced bonding between substrate 12 and silicone elastomer 14 by adding a layer of epoxy 120 is depicted. A continuous layer of epoxy 120 can be applied on top of substrate 12. In some embodiments, epoxy 120 can be for example the biocompatible low viscosity epoxy Epotek™ 320-2FL. In this way the delamination interface 13 as depicted in FIG. 1 is replaced with stronger bonding interfaces 119 and 121 as shown in FIG. 4. Other epoxies could also be used. In some examples, epoxies filled with metal particles could also be used to exploit the metal bondability to silicone elastomer.

FIGS. 1 to 4 have depicted a cross section of a flat substrate 12, however, in some embodiment's, substrate 12 could be non-flat, three dimensional, and be in any shape or combination of shapes.

Figure 5:
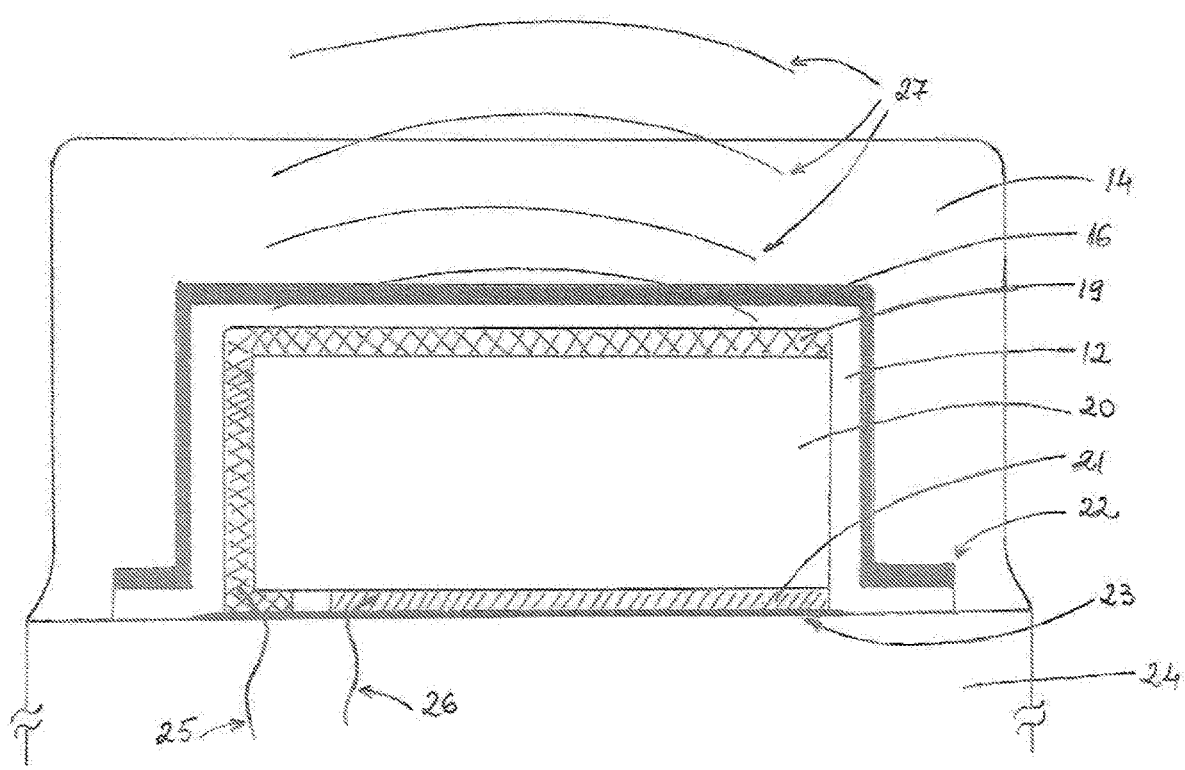
FIG. 5 depicts a cross-section view of an embodiment of a composite material (parylene-sputtered metal or oxide-silicone primer-silicone elastomer) in use to provide an ultrasonic transducer coated in silicone elastomer.

Referring now to FIG. 5, in some embodiments, a composite material structure with enhanced bonding (for example, parylene-sputtered metal or oxide-silicone primer-silicone elastomer) can be used to provide an ultrasonic transducer coated in silicone elastomer. Bare transducer 20 can be any shape of ultrasound transducer and any type (piezo-ceramic or crystal, or capacitive micro-machined) and can be configured to emit ultrasound waves 27. Transducer 20 can include a top electrode 19, that can be a multitude of electrodes if the transducer is a transducer array, and wire 25 for electrical connection of top electrode 19, and a bottom electrode 21, that can be a multitude of electrodes if the transducer is a transducer array, and wire 26 for electrical connection of bottom electrode 21. A transducer holder 24 can be used to connect mechanically, electrically and/or acoustically (for damping or reflection of ultrasound) to ultrasound transducer 20, and in some embodiments, specifically to its bottom electrode 21 side. Attachment means 23 such as glue, adhesive, or epoxy can be used to attach the transducer 20 to its holder 24. A masking edge 22 for parylene and sputtered metal or oxide around the top of the transducer holder 24 can be used.

Referring now to FIG. 6A, an embodiment of a composite material structure including a three dimensional (3D) support 28 is depicted to which the enhanced bonding structure can be utilized to attach silicone elastomer 14 to the paryelne 12a coated support 28 using sputtered material 16.

Referring now to FIG. 6B, an embodiment of a composite material structure including a three dimensional (3D) support 28 (which in some embodiments, can be made of polycarbonates 12b material) is depicted to which the enhanced bonding structure can be utilized to attach silicone elastomer 14 to a polycarbonate 12b support using sputtered material 16.

Embodiments such as the ones presented in FIGS. 6A and 6B can be utilized in various applications such as medical (artificial body joints or articulations, etc), mechanical (ball joints, etc) or chemical (where chemical inert components are required). The silicone elastomer can be applied by molding, gluing, potting, etc.

Referring now to FIG. 7A, a similar composite material structure as in FIG. 2 is depicted. In this case, however, support 10 has been removed from substrate 12. This removal can be done, for example, by coating support 10 with a bonding/adhesion inhibitor (for example mold release grease or soap) prior to substrate 12 deposition. This can allow for easy removal of support 10 from substrate 12, if required or desired.

Referring now to FIG. 7B, a further embodiment of a composite material structure modified from that of FIG. 7A. A second material film 30, on the opposite side of the substrate 12 than material layer 16 can be added. The second material film 30 can have the same properties and be applied similarly as material film 16. In other embodiments, second material film 30 can have different properties and be applied differently than material film 16. In addition, a second layer of silicone elastomer 32 can then be applied on the second metal film 30. The second silicone elastomer layer 32 can have the same properties and be applied similarly as the silicone elastomer layer 14, including the use of primer where a strong bonding result is desired. In other embodiments, second silicone elastomer layer 32 can have different properties and be applied differently than silicone elastomer layer 14, including the use of primer where a strong bonding result is desired.

Figure 7C:
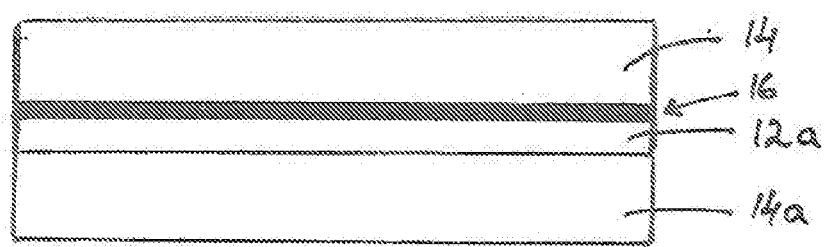
FIG. 7C depicts a cross-section view of an embodiment of a composite material such as that depicted in FIGS. 7A and 7B, with a support material of cured silicone elastomer.

Referring now to FIG. 7C, a further embodiment of a composite material structure is depicted. In some embodiments, a polymer substrate can be strongly bonded between two layers of silicone elastomer film (similar with the one presented in FIG. 7B) and can be obtained while using only one layer/process of sputtered metal or oxide (not two metal layers 16 and 30 as in FIG. 7B). In such a case, a support material 14a made of cured silicone elastomer can be used. Next, the parylene substrate 12a can be deposited on top of the cured silicone elastomer 14a. Parylene substrate 12a can bond strongly to the cured silicone elastomer 14a. Next, a layer of sputtered material 16 can be sputtered on top of the parylene substrate 12a, followed by priming the sputtered material layer 16, before depositing/molding the second layer of silicone elastomer 14 on top of the metal layer 16. The cured silicone elastomer support 14a can have the same properties as the applied/molded top layer of silicone elastomer 14. In other embodiments, the cured silicone elastomer support 14a can have different properties than the applied/molded top layer of silicone elastomer 14.

The composite material structures of FIGS. 7A, 7B, and 7C can be manufactured in large sheets, and cut in smaller pieces as desired.

Figure 8:
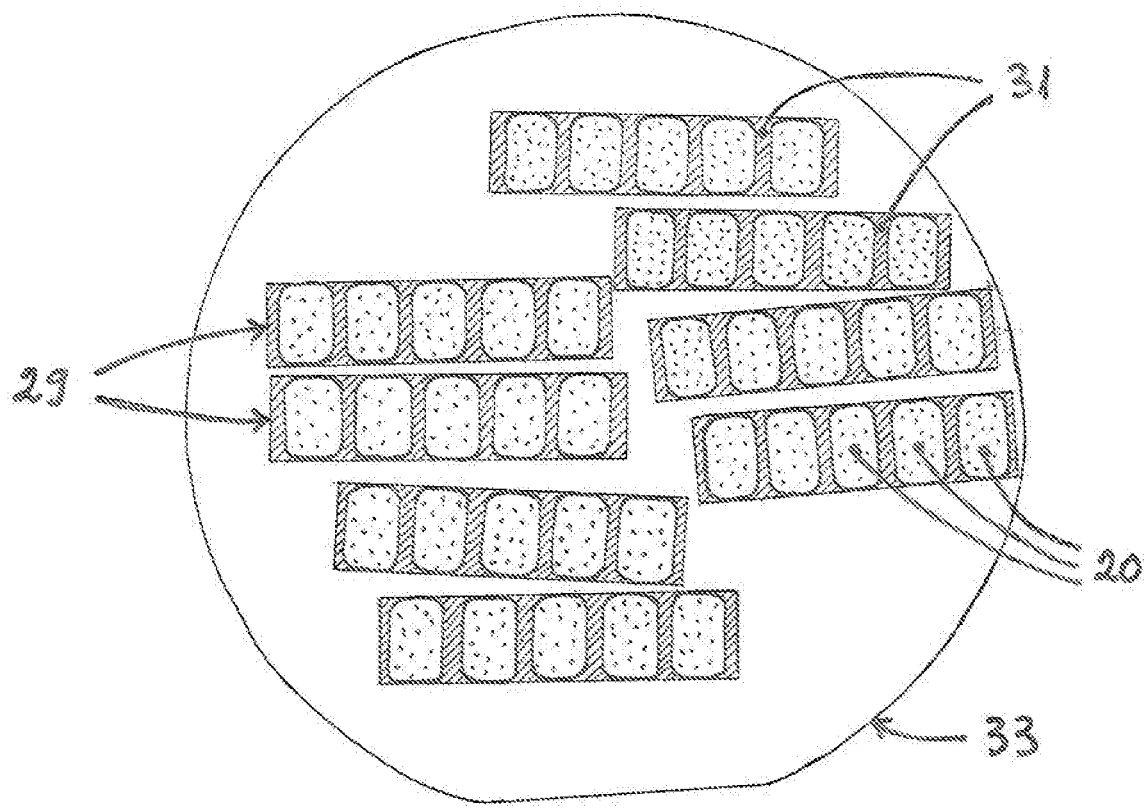
FIG. 8 depicts a plan view of an embodiment of a support, such as a flexboard assembly, aligned on a silicon wafer in preparation of material sputtering.

Referring now to FIG. 8, and as further discussed in the Examples section that follows, multiple flexboard assemblies 29 (with transducers 20 mounted on Flexible Circuit Boards 31) encapsulated in parylene can be aligned on a carrier 33 (such as a silicon wafer, aluminum or stainless steel disc) in preparation of titanium or titanium dioxide sputtering. The flexboard assemblies 29 can be arranged on a supplied carrier 33 such that all transducer 20 top surfaces are exposed and unobstructed. The sides of the flexboard assemblies 29 can also be unobstructed with at least two-three millimeters of clearance around all transducers 20, in order to allow side wall metal or oxide coverage during sputtering. The flexboard assemblies 29 can be securely mounted on the carrier 33, for example by using double-sided Kapton™ tape.

In some embodiments, a liquid interface between delaminated materials (for example, parylene and silicone elastomer) can allow a good propagation of ultrasound through the delaminated structure, if that liquid/fluid would have similar acoustic properties with the silicone elastomer. A full delamination between parylene and silicone layers can be used and filled as a small gap (receptacle) with a liquid that has the same acoustic properties as the silicone elastomer. In some embodiments, liquid silicone such as those used in breast implants can be used. These types of liquid silicone do not cure (remain liquid) and have similar properties with silicone elastomers (which do cure and become solid).

In some embodiments, medical grade liquid silicone, such as those from Nusil™, can be injected (with a syringe for example) at a delaminated interface between the silicone elastomer and parylene of an ultrasound emitting device. In some embodiments a sealable port or injection valve can be used at the injection site so that liquid silicone does not leak out from the structure through the injection orifice. The ultrasound power can be measured and it can be observed that the ultrasound can propagate well through the structure as if there was no delamination.

From an ultrasound propagation perspective, such a structure can be non-delaminateable (as it is already fully delaminated), and no force can make the bonding worse as the bonding is performed by a fluid flexible interface.

As an advantage of this arrangement and technique, only a very small amount of liquid silicone is required, as the liquid will naturally fill the delamination gap due to capillarity forces existing in the narrow delamination gap. In embodiments where there is an array of delaminated transducers that are desired to be filled with liquid silicone, one does not need to inject each individual transducer, but can ensure that all the delaminated areas are interconnected (through delaminated paths or microfluidics type structures), and use of a single injection port/valve.

As examples, two ways to achieve a desired, good, acoustic coupling between an ultrasound transducer and its silicone encapsulation are: a) a good attachment (strong bonding) of the silicone elastomer encapsulation to the transducer, or b) totally delaminated silicone elastomer encapsulation, but where the delamination gap can be filled with a liquid medium that has similar acoustic properties with the silicone elastomer so that the ultrasound waves can propagate at the interface between the transducer and silicone elastomer without acoustic interference.

Such an injected material that can be injected in the delamination gap is liquid silicone (a silicone that never cures, always stays liquid, such as the liquid silicone use in medical implants for example breast implants). In this way, as the attachment between the transducer and the silicone elastomer encapsulation is already delaminated/detached, but the delamination gap can be filled with liquid silicone with acoustic properties (acoustic impedance) similar with the silicone elastomer, from the acoustic behavior perspective, the transducer can emit and sense ultrasound as in the case when the silicone elastomer encapsulation has a good attachment to the transducer. However, in this scenario because the interface transducer elastomer is already detached, there is no risk in the future use of the transducer head to suffer delamination, because it is already fully delaminated however, it is encapsulated.

Figure 9A:
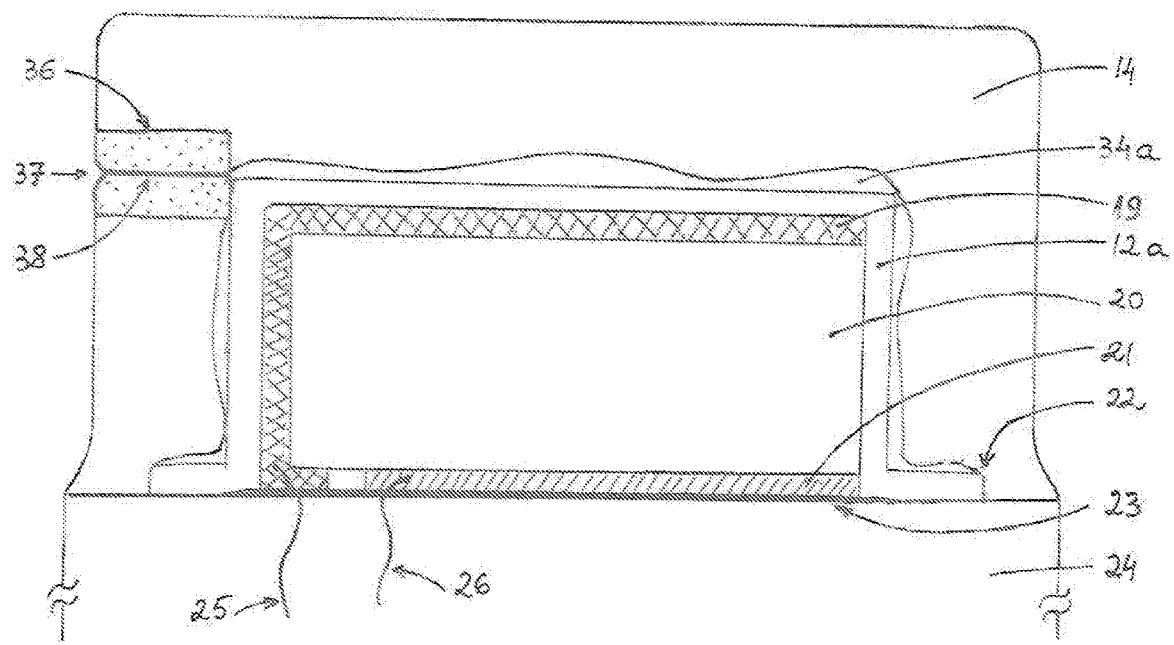
FIG. 9A depicts a cross-section view of an embodiment of an ultrasound transducer and composite material with a means for liquid silicone injection in the absence of liquid silicone.

FIG. 9A illustrates an embodiment of an ultrasound transducer 20 coated with parylene 12a and then covered in silicone elastomer 14. The silicone elastomer 14 can be unbound to the parylene 12a, and at the delamination interface 13, a very narrow delamination gap 34a can form and recreate a receptacle. Because of this delaminating gap, the ultrasound emitted by the transducer 20 cannot be transmitted to the silicone elastomer 14 (so the transducer cannot emit ultrasound to an outside target or tissue). In addition, this embodiment can include a valve 36 being incorporated in the silicone elastomer 14. Valve 36 can be a stand-alone part incorporated in the structure before over-molding the silicone elastomer 14, or can be created as a part from the silicone elastomer 14 itself.

The valve 36 can have the functionality of allowing unidirectional injection/flow of a liquid from the exterior to the delamination gap 34a (for example, through a one way valve). The valve 36 can have an injection entrance 37 and a channel 38 that connects the exterior to delamination gap 34a. The gap 34a can be filled with a liquid with similar acoustic properties as the silicone elastomer 14. For example, this liquid can be a liquid silicone (a silicone that stays liquid and does not cure). The liquid silicone can be injected for example by using a syringe with a needle.

Valve 36 can also be obtained from the forming of the silicone elastomer 14 itself, by placing a thin wire between the parylene 12a surface and the exterior prior to elastomer 14 molding/application. The wire can be greased (to avoid bonding with elastomer 14) and once the elastomer 14 is applied and cured, the wire can be pulled out, which can create a channel 38 (such as a micro-fluidic channel). The diameter of the wire can be as small as possible, in order for the valve to be able to close when the needle is retracted and so the liquid silicone cannot leak outside the filled delamination gap.

Figure 9B:
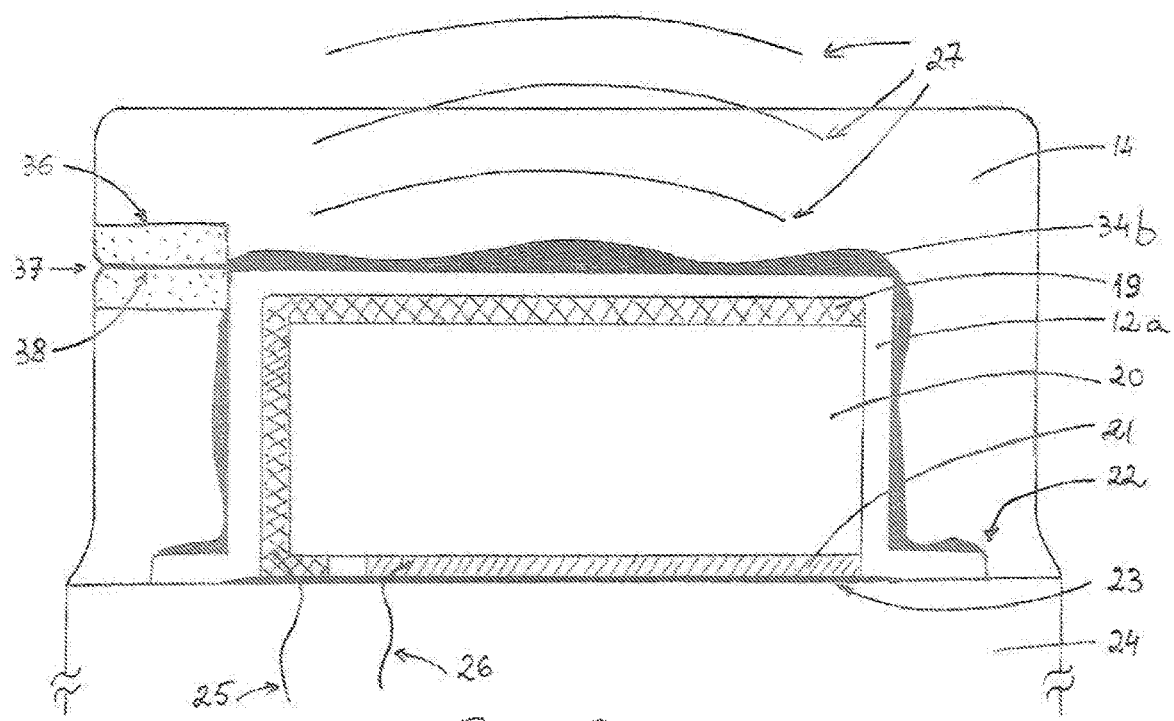
FIG. 9B depicts a cross-section view of an embodiment of an ultrasound transducer and composite material with a means for liquid silicone injection in the presence of liquid silicone and with the transducer emitting ultrasound waves.

FIG. 9B illustrates the structure from FIG. 9A, where the delamination gap 34a has been filled with liquid silicone 34b to allow the transmission of ultrasound waves 27.

Another method to introduce liquid silicone is to have the liquid silicone pre-encapsulated in a capsule type structure, then place the capsule in the proximity of the transducer/delamination area before elastomer over-molding or gluing, and once the elastomer encapsulation of the overall transducer has cured, then releasing the liquid silicone from the capsule. The liquid silicone can naturally fill (due to capillarity forces) the delamination gap through a channel or pathway. In such embodiments, there is no entry or exit point of liquid silicone in/from the device, and so leaks at the entry/exit point/valve is ameliorated or eliminated. The liquid silicone from the capsule can be released by several means. For example, if the capsule wall is made of wax or plastic, the elastomer can be pre-cured under the melting temperature of the capsule (so that the capsule walls maintain its integrity). Next, the capsule walls are heated over their melting temperature, resulting in the liquid silicone being released and therefore, the liquid silicone can fill the encapsulation gap. A final curing of elastomer (to obtain desired hardness for example) at the desired higher temperate can be done after this point, as the elastomer encapsulation envelop was already built and the liquid silicone cannot leak outside the structure.

Figure 10A:
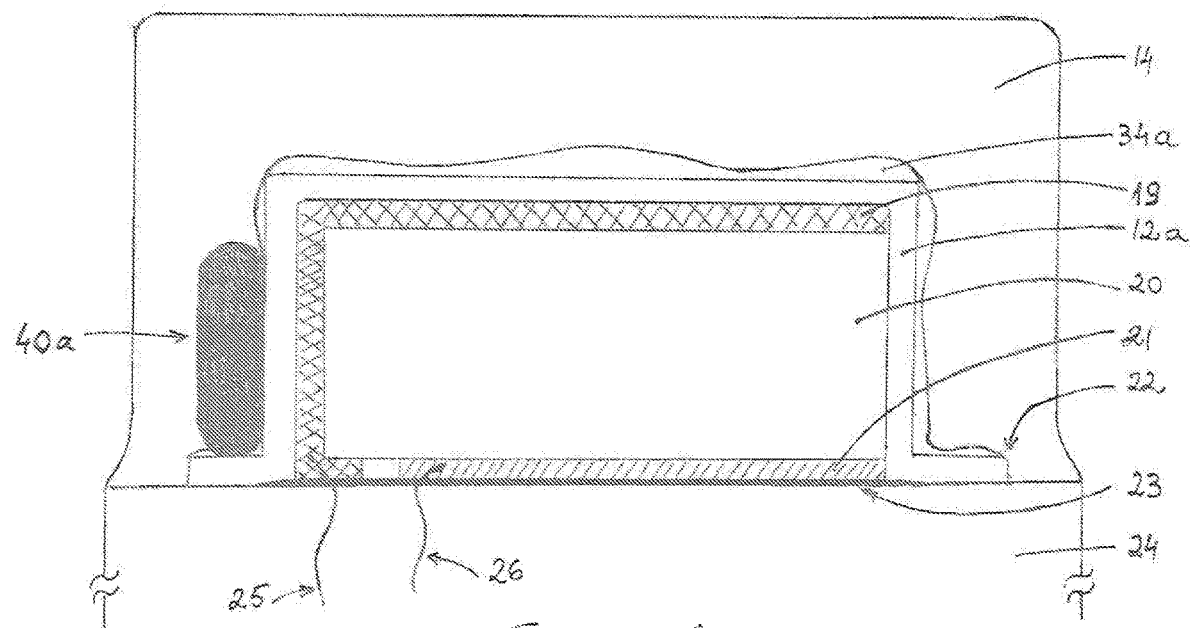
FIG. 10A depicts a cross-section view of an embodiment of an ultrasound transducer and composite material with a liquid silicone capsule where the liquid silicone has not been released from the capsule.
Figure 10B:
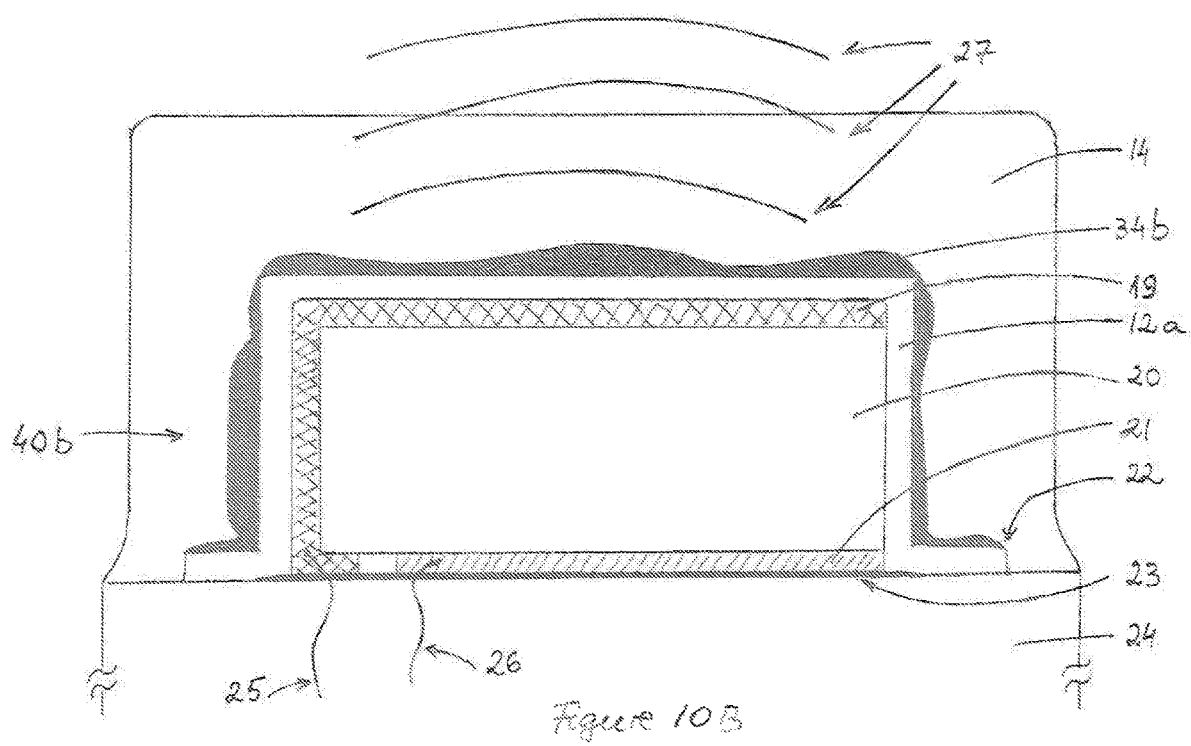
FIG. 10B depicts a cross-section view of an embodiment of an ultrasound transducer and composite material with a liquid silicone capsule in the presence of liquid silicone (where the liquid silicone has been released from the capsule) and with the transducer emitting ultrasound waves.

FIG. 10A depicts an embodiment where a capsule 40a filled with liquid silicone is incorporated in the silicone elastomer 14 at the delamination interface 13. FIG. 10B shows an embodiment where liquid silicone from emptied liquid silicone capsule 40b is released in the delamination gap to allow for the transmission of ultrasound waves 27.

Without any limitation to the foregoing, the present apparatuses and methods are further described by way of the following examples.

Example 1

Flexboard Assembly Preparation for Parylene Encapsulation

This example describes a procedure to prepare and properly position a support such as a flexible circuit board (flexboard or FCB) assembly with electrical connecting pads for parylene encapsulation. An FCB assembly can be made of the FCB and other components (such as electronic components, ultrasound transducers, etc.) soldered or attached to the FCB.

The FCB assemblies are cleaned and a single layer of tape, for example ½" wide Kapton™ tape (single sided), is applied over the connecting pads for masking the pads.

A mounting apparatus (for example, a paper clip) can be attached to the flexboard assembly using Kapton™ tape or other tapes. The paper clip can be attached on top of the connecting pads area already covered by tape. The paper clip can be bent as required.

The paper clips of the FCB assemblies can be hung in the parylene deposition chamber in a manner that the FCB assemblies do not touch each other.

Parylene encapsulation can be performed using the parameters herein: Equipment Name: PDS 2010 Labcoater 2; Source: SCS Parylene 0; Desired Parylene C Mass (g): 30; Furnace Temperature Setting (° C.): 690; Vaporizer Temperature Setting (° C.): 175; Deposition Set Point Setting: 35 vacuum units.

For an inspection of the parts, post deposition, a visual verification of parylene deposition on the part can be done. In addition, a parylene sample from the top liner of parylene chamber can be obtained and measured for thickness. For the above mentioned parameters, an approximately 20 µm thick parylene is expected to be deposited on the parts (FCB assemblies) and the deposition chamber walls.

Example 2

Flexboard Assembly Preparation for Titanium Sputtering

This example describes a procedure to prepare and properly position a support or a substrate, such as a parylene encapsulated FCB assembly for metal sputtering.

The paper clips attached for the parylene encapsulation can be removed. The Kapton™ tape protecting the connector pads of the flexboard assembly can be unremoved.

Double-sided Kapton™ tape can be applied on the back surface of the flexboard assembly.

At least one silicon wafer can be provided and the flexboard assemblies can be arranged on a supplied silicon wafer such that all transducer surfaces are exposed and unobstructed. Referring to FIG. 8, flexboard assemblies (with transducers mounted on the FCB) can be aligned on the silicon wafer in preparation of titanium sputtering.

The sides of the flexboard transducer arrays can be unobstructed with at least two to three millimeters of clearance around all transducers, in order to allow side wall metal coverage during sputtering.

The flexboard assemblies can be securely mounted on the wafer. Additional double-sided Kapton™ tape can be used as required.

Sputtering can be performed using the parameters herein: Cryo Pump Temperature (K): Between 10-14; Pump Down Pressure Setting (Torr): Less than or equal to $2.5 \times 10^{-6}$, Argon Pressure Setting (mTorr): 7±0.2; Titanium Sputter Power Setting (W): 300±5; Titanium Sputter Duration (minutes): 32±1.

Using the above parameters, the thickness of Titanium (nm) sputtered on top of the parylene coated FCB assembly can to be approximately 200 nm.

Example 3

Priming Procedure

This example describes a procedure to prime a support or a substrate, such as a parylene encapsulated and sputtered FCB assembly to enhance silicone elastomer bonding.

The FCB assembly can be cleaned and dried before applying the silicone primer.

The silicone primer MED6-161 can be applied with techniques as would be known in the art such as by manual Q-tip™/stick application, dunking, spraying etc. in concentrated form or diluted form.

In some embodiments, MED162 primer can be used in place of MED6-161 primer. Other silicone primers could be used.

The primer application can be performed in a well-ventilated area. The primed flexboard assembly can sit in the open air for primer activation for a period of about 30 minutes before use. The primed flexboard assembly can be oriented with the transducers facing upwards to allow for adequate airflow over its surface. A primed flexboard assembly can be molded within two hours of priming. If not, the flexboard assembly can be cleaned and primed again as there is a slightly higher risk of decreased primer effectiveness and thereby creating defective parts if a primed material is allowed to sit for more than two hours.

Example 4

Bonding Scales

This example describes a bonding scale used to compare the relative strength of bonded composite materials. A five point scale is provided, although one skilled in the art would understand that other numbers, percentages, etc. could be used and it is the relative difference which is to be noted.

TABLE 2

Bonding Ranking Scale
Within this document, the following terminology will be used for bonding:

| Bonding ranking scale | Bonding strength | Description |
|---|---|---|
| One (1) | No bonding | Complete or partial visual delamination/ |
| Two (2) | Weak bonding | Slight bonding. Few areas have visual delamination without applying force. Complete delamination occurs when minimal force is applied. |
| Three (3) | Fair bonding | Noticeable bonding occurs. Moderate force required to delaminate entire layer. |
| Four (4) | Good bonding | Noticeable bonding occurs. High force needed to delaminate the entire layer. Hard to peel, but when a crack starts to form, the two layers can be removed from each other with a high force. |
| Five (5) | Strong bonding | Irreversible bonding. Bonding cannot be undone. The two layers cannot be separated at their interface line. Attempts to separate the two layers results in breaking one of the layers. |

Example 5

Results

This example describes the scoring of the relative strength of bonded composite materials created with methods described herein (see Table 1—Summary of bonding results) and using the bonding scales referred to herein (in Table 2).

Regarding the tests reported in Table 1, and as examples only: the parylene used was parylene C; the cleaning procedure for the parylene substrate and for the polycarbonate substrate included of a sequence of IPA sonication, water rinse, Nitrogen blow dry and heat lamp drying; the silicone elastomer used in these tests was MED-6033, cured at 150° C. for parylene substrate samples and at 120° C. for the polycarbonate substrate samples for 30 minutes; the silicone primer used was MED6-161. The substrate had been primed as described in Example 3.

The scope of the claims should not be limited by the embodiments as set forth in the examples herein, but should be given the broadest interpretation consistent with the description as a whole.

Although a few embodiments have been shown and described, it will be appreciated by those skilled in the art that various changes and modifications can be made to the embodiments described herein. The terms and expressions used in the above description have been used herein as terms of description and not of limitation, and there is no intention in the use of such terms and expressions of excluding equivalents of the features shown and described or portions thereof, it being recognized that the invention is defined and limited only by the claims that follow.

While the above description details certain embodiments of the invention and describes certain embodiments, no matter how detailed the above appears in text, the invention can be practiced in many ways. Details of the apparatuses and methods may vary considerably in their implementation details, while still being encompassed by the invention disclosed herein. These and other changes can be made to the invention in light of the above description.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification. Accordingly, the actual scope of the invention encompasses not only the disclosed embodiments, but also all equivalent ways of practicing or implementing the invention.

The above description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. The elements and acts of the various embodiments described above can be combined to provide further embodiments.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

REFERENCES

The following references are hereby incorporated into this application by reference in their entirety.
1. United States Patent Application 20080181930
2. United States Patent Application 20060018080
3. U.S. Pat. No. 5,380,320
4. U.S. Pat. No. 5,075,174A
5. U.S. Pat. No. 5,488,957
6. United States Patent Application 20130022756 A1
7. WO 1999054786 A1
8. U.S. Pat. No. 8,695,640 B2 and U.S. Pat. No. 8,656,958 B2
9. U.S. Pat. No. 8,609,178 B2
10. Martensson et al "High incidence of defective ultrasound transducers in use in routine clinical practice", European Journal of Echocardiography (2009) 10, 389-394.
11. Martensson et al., "Ultrasound transducer function: annual testing is not sufficient", European Journal of Echocardiography (2010) 11, 801-805.
12. Schabrun et al., "Are therapeutic ultrasound units a potential vector for nosocomial infection?", Physiotherapy Research International Physiother. Res. Int. 11(2) 61-71 (2006).

We claim:

1. A composite material coated ultrasound transducer comprising:
   a polymer substrate disposed directly on the surface of the ultrasound transducer, the polymer substrate comprising parylene or polycarbonate;
   an intermediary material sputtered onto the polymer substrate, the intermediary material comprising a metal, a metal alloy, a metal oxide, a metal nitride, or an oxide; and
   a silicone lens comprising a silicone elastomer, the silicone elastomer bonded to the polymer substrate via the intermediary material therebetween;
   wherein the intermediary material forms a substantially continuous layer across the entire surface of the polymer substrate, between the silicone elastomer and the polymer substrate, that increases the relative strength of the bonding of the silicone elastomer to the entire surface of the polymer substrate.

2. The composite material coated ultrasound transducer of claim 1, wherein the polymer substrate is parylene.

3. The composite material coated ultrasound transducer of claim 2, wherein the parylene is selected from the group consisting of parylene-N, parylene-C, and parylene-D.

4. The composite material coated ultrasound transducer of claim 1, wherein the silicone elastomer is formed from a silicon composition selected from the group consisting of liquid silicone rubber and room temperature vulcanization silicone.

5. The composite material coated ultrasound transducer of claim 1, wherein the metal is selected from the group consisting of Au, Ti, Al, W, and a combination thereof.

6. The composite material coated ultrasound transducer of claim 5, wherein the metal is Ti.

7. The composite material coated ultrasound transducer of claim 1, wherein the oxide is selected from the group consisting of zinc oxide, tin oxide, and titanium dioxide.

8. The composite material coated ultrasound transducer of claim 7, wherein the oxide is titanium dioxide.

* * * * *